United States Patent [19]
Suhara

[11] Patent Number: 5,942,742
[45] Date of Patent: *Aug. 24, 1999

[54] DEVICE AND METHOD FOR READING BAR CODE

[75] Inventor: Masaaki Suhara, Osaka, Japan

[73] Assignee: Keyence Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/629,885

[22] Filed: Apr. 10, 1996

[30] Foreign Application Priority Data

Apr. 13, 1995 [JP] Japan .................................. 7-088316

[51] Int. Cl.$^6$ .................................................. G06K 7/14
[52] U.S. Cl. ............................ 235/462.14; 235/462.06; 235/462.22; 235/462.23; 235/462.24; 235/462.44; 235/454
[58] Field of Search .................................. 235/462, 472, 235/462.06, 462.14, 462.22, 462.23, 462.24, 462.44, 454

[56] References Cited

U.S. PATENT DOCUMENTS

| | | | |
|---|---|---|---|
| 3,517,167 | 6/1970 | Bell | 235/455 |
| 3,964,296 | 6/1976 | Matzuk | 73/67.5 |
| 4,297,699 | 10/1981 | Fowler et al. | 343/5 |
| 4,382,267 | 5/1983 | Angle | 358/213 |
| 4,635,108 | 1/1987 | Reeber et al. | 358/76 |
| 4,692,603 | 9/1987 | Brass et al. | 235/454 |
| 4,761,544 | 8/1988 | Poland | 235/462 |
| 4,861,972 | 8/1989 | Elliott et al. | 235/462 |
| 4,935,610 | 6/1990 | Wike, Jr. | 235/472 |
| 5,061,954 | 10/1991 | Toyama et al. | 354/402 |
| 5,142,286 | 8/1992 | Ribner et al. | 341/143 |
| 5,308,962 | 5/1994 | Havens et al. | 235/455 |
| 5,343,027 | 8/1994 | Knowles et al. | 235/462 |
| 5,382,782 | 1/1995 | Hasegawa et al. | 235/472 |
| 5,396,053 | 3/1995 | Swartz et al. | 235/462 |
| 5,406,061 | 4/1995 | Knight | 235/462 |
| 5,406,062 | 4/1995 | Hasegawa et al. | 235/462 |
| 5,406,329 | 4/1995 | Kashimura et al. | 348/175 |
| 5,463,211 | 10/1995 | Arends et al. | 235/462 |
| 5,484,992 | 1/1996 | Wilz et al. | 235/472 |
| 5,517,331 | 5/1996 | Murai et al. | 358/486 |
| 5,525,810 | 6/1996 | Jewell et al. | 250/566 |
| 5,532,467 | 7/1996 | Roustaei | 235/472 |
| 5,550,747 | 8/1996 | Newman, Jr. | 364/485 |

FOREIGN PATENT DOCUMENTS

| | | | |
|---|---|---|---|
| 62-154070 | 7/1987 | Japan | 235/462 |
| 406004701 | 1/1994 | Japan | 235/462 |

*Primary Examiner*—Donald Hajec
*Assistant Examiner*—Douglas X. Rodriguez
*Attorney, Agent, or Firm*—Sughrue, Mion, Zinn, Macpeak & Seas, PLLC

[57] ABSTRACT

By a user setting process, the set values of a number of scans and the LED lighting-on pulse-width are written, in advance, into a set value table stored in an EEPROM. Before a measurement starts, a CPU reads out table set values from the EEPROM, and a CCD-drive control circuit drives a CCD image sensor at the maximum operating frequency. After the measurement starts, a light-projection LED drive circuit lights on the light-projection LED array on the basis of the set value of the LED lighting-on pulse-width. The CCD-drive control circuit changes the interval of the outputting of a CCD-drive control signals CD on the basis of the set value of the number of scans.

29 Claims, 4 Drawing Sheets

DEVICE AND METHOD FOR READING BAR CODE

BACKGROUND OF THE INVENTION

1. Field of the Invention

The present invention relates to a bar code reading device and a bar code reading method using an image pickup element (image sensor).

2. Discussion of the Prior Art

In the bar code reading device using an image pickup element, the entire range of a bar code to be read out from one end thereof to the other end are simultaneously illuminated with light projected from an LED (light emitting diode) array. A CCD (charge coupled device) image sensor, for example, simultaneously receives light reflected from the bar code, and transforms it into electrical signals. The electrical signals are converted into numerical values, and the converted numerical values are analyzed, whereby bar code information is read out. Such a reading operation is repeated till a predetermined measurement end condition is satisfied. One reading operation will be referred to as one scan.

The processing speed becomes higher as the frequency of the reading operation (the number of scans per unit time) is higher. A time that a bar code is imaged on the image pickup element is inversely proportional to the number of scans per unit time. Therefore, as the number of scans per unit time increases, an amount of received light per scan becomes smaller, and hence a read rate (a ratio of a number of successful readings to a number of reading operations) becomes smaller. The number of scans per unit time is set at a fixed value in advance by a hardware construction of each bar code reading device.

Generally, in the bar code reading device using the image pickup element, the entire range of the bar code is simultaneously illuminated with light, and the light reflected from the bar code is received for a preset time. Accordingly, if the bar code is moved during the measurement, it is impossible to accurately read out bar code information. In other words, to accurately read out bar code information by using the bar code reading device, it is necessary to put an object with a bar code label in a standstill state.

In production lines in a factory, there is a strong demand to accurately read a bar code attached to a moving object by using a small bar code reading device provided with the image pickup element. To meet the demand, there is proposed a method of measuring a moving bar code in a manner that the LED is lit on for a time duration shorter than a time that the bar code is imaged on the image sensor.

In this case, as the lighting time of the LED is shorter, the adverse affect by the movement of the bar code is more lessened. However, the read rate is decreased since the amount of light projected on the bar code is reduced. It is for this reason that the lighting time of the LED is preset to a proper fixed value by a hardware construction for each bar code reading device designed for its use purpose.

The best number of scans and the best lighting time of the LED are determined depending on use conditions, such as presence or absence of a bar code to be measured, a moving speed of the bar code, measurement distance, and the like. For this reason, it is desired that in reading bar code information, a user may set the bar code reading device in the best operating state in accordance with current use conditions.

SUMMARY OF THE INVENTION

Accordingly, an object of the present invention is to provide a bar code reading device which is capable of reading out bar code information in the best operating state in accordance with current use conditions.

A bar code reading device of a first invention comprises: a light projecting means for projecting light on a bar code to be read out; an image picking-up means for receiving light reflected from the bar code that is illuminated with the light projected from the light projecting means and converting the reflected light into electrical signals; a binarizing means for converting the electrical signals outputted from the image picking-up means into binary data; an analyzing means for analyzing the binary data derived from the binarizing means and reading bar code information; an operating frequency setting means for arbitrarily setting an operating frequency of the image picking-up means in advance; and control means for driving the image picking-up means at the operating frequency set by the operating frequency setting means.

A bar code reading device of a second invention comprises: a light projecting means for projecting light on a bar code to be read out; an image picking-up means for receiving light reflected from the bar code that is illuminated with the light projected from the light projecting means and converting the reflected light into electrical signals; a binarizing means for converting the electrical signals outputted from the image picking-up means into binary data; an analyzing means for analyzing the binary data derived from the binarizing means and reading bar code information; an operating frequency setting means for arbitrarily setting a first operating frequency of the image picking-up means in advance; and control means for driving, before a measurement starts, the image picking-up means at a second operating frequency that is higher than the first operating frequency, and for changing, after the measurement starts, the operating frequency of the image picking-up means to the first operating frequency set by the operating frequency setting means.

A bar code reading device of a third invention comprises: a light projecting means for projecting light on a bar code to be read out; an image picking-up means for receiving light reflected from the bar code that is illuminated with the light projected from the light projecting means and converting the reflected light into electrical signals; a binarizing means for converting the electrical signals outputted from the image picking-up means into binary data; an analyzing means for analyzing the binary data derived from the binarizing means and reading bar code information; a light-projection time setting means for arbitrarily setting a time of projecting the light by the light projecting means in advance; and control means operating such that the control means repeats a reading operation by the image picking-up means, the binarizing means and the analyzing means, and causes the light projecting means to project the light for the light projection time set by the light-projection time setting means every reading operation.

In the bar code reading devices of the first to third inventions, a bar code to be read out is illuminated with light, and light reflected from the bar code is received and transformed into an electrical signal. The electrical signal is converted into binary data. The binary data is analyzed and bar code information is read as the result of the analysis. The reading operation is repeated till a predetermined measurement end condition is satisfied.

Particularly, in the bar code reading device of the first invention, an operating frequency of the image picking-up means may be arbitrarily preset by the operating frequency setting means. Therefore, during a measurement, the image picking-up means is driven at the preset operating frequency. Accordingly, the user may adjust the operating frequency of the image picking-up means so that the bar code reading device reads out bar code information in the best operating state in accordance with current use conditions.

In the bar code reading device of the second invention, a first operating frequency of the image picking-up means may arbitrarily be set by the operating frequency setting means. Before a measurement starts, the image picking-up means is driven at a second operating frequency that is higher than the first operating frequency. After the measurement starts, the operating frequency of the image picking-up means is changed to the first operating frequency that is set. Accordingly, the user may adjust the operating frequency of the image picking-up means so that the bar code reading device reads out bar code information in the best operating state in accordance with current use conditions. Further, the image picking-up means is driven at the high operating frequency before the measurement starts. A time from the issuance of a command to start a measurement to the start of the measurement is reduced, ensuring a quick start of the measurement.

In the bar code reading device of the third invention, a time of projecting light by the light projecting means may be arbitrarily set in advance by the light-projection time setting means. With this, light is projected onto the bar code for the preset time for each reading operation. Accordingly, the user may adjust the time of projecting light onto the bar code so that the bar code reading device reads out bar code information in the best operating state in accordance with current use conditions.

DETAILED DESCRIPTION OF THE PREFERRED EMBODIMENT

Figure 1:
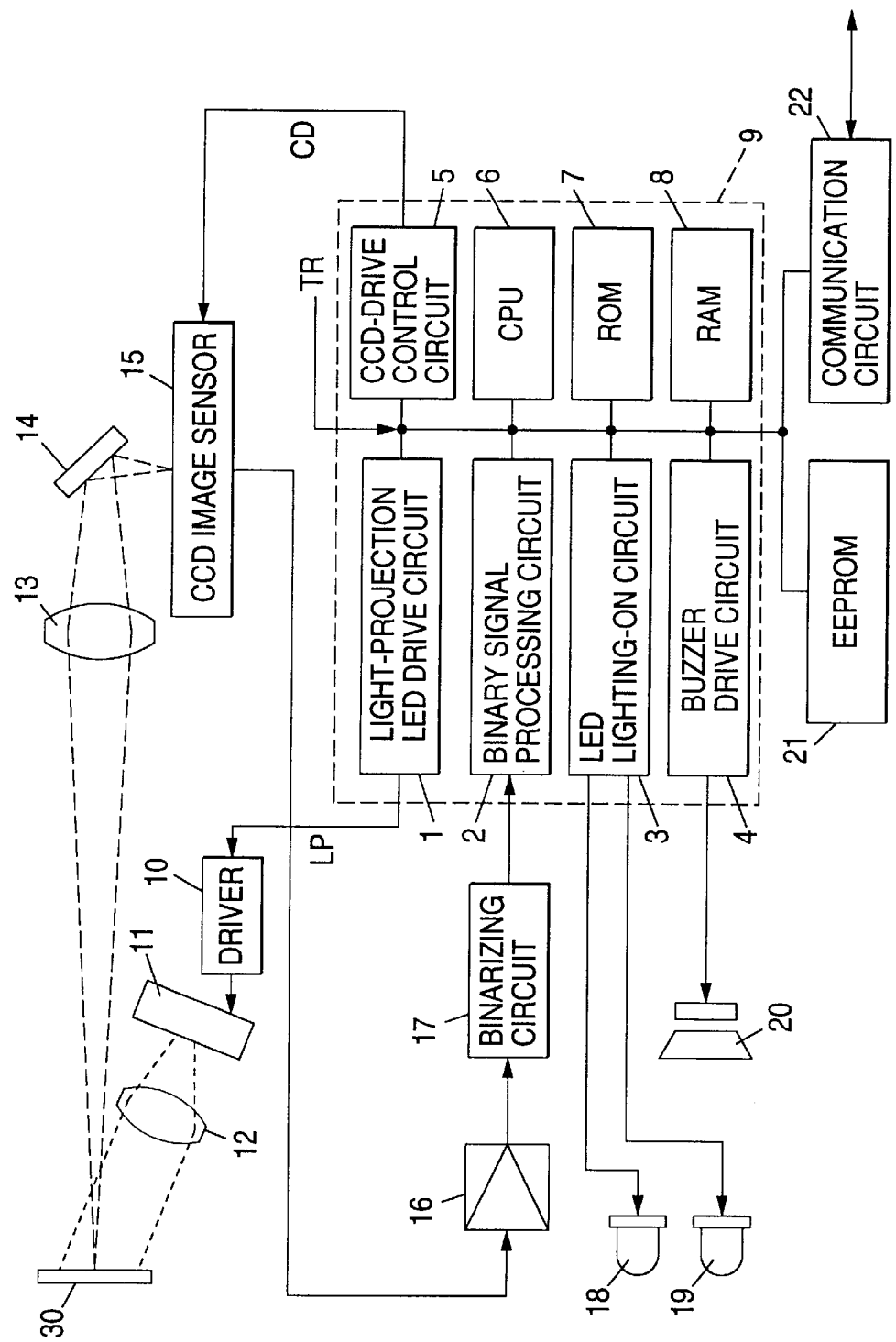
FIG. 1 is a block diagram showing an arrangement of a bar code reading device according to an embodiment of the present invention.

FIG. 1 is a block diagram showing an arrangement of a bar code reading device according to an embodiment of the present invention. In FIG. 1, a light-projection LED drive circuit 1, a binary signal processing circuit 2, an LED lighting-on circuit 3, a buzzer drive circuit 4, a CCD-drive control circuit 5, a CPU (central processing unit) 6, a ROM (read only memory) 7, and a RAM (random access memory) 8 make up a one-chip microcomputer 9.

The light-projection LED drive circuit 1 drives a light-projection LED array 11 through a driver 10. Light emitted from the light-projection LED array 11 is projected through a projection lens 12 to a bar code 30. Light reflected from the bar code 30 is applied to a mirror 14 through a light receiving lens 13, and reflected by the mirror, and reaches a CCD image sensor 15. The CCD image sensor 15 is driven by the CCD-drive control circuit 5.

The CCD image sensor 15 transforms the received light into an electrical signal. The electrical signal derived from the CCD image sensor 15 is applied through an amplifier 16 to a binarizing circuit 17. The binarizing circuit 17 binarizes the amplified signal into binary signals. The binary signals outputted from the binarizing circuit 17 are sequentially stored as binary data into the RAM 8 by a DMA (direct memory access) method, for example. The binary signal processing circuit 2 analyzes (decodes) the binary data that is stored in the RAM 8, and reads bard code information.

The LED lighting-on circuit 3 lights on LEDs 18 and 19 for visually indicating a state of reading the bar code information by the binary signal processing circuit 2. The LED 18 visually indicates the presence or absence of the reading of the bar code information. The LED 19 visually indicates a stability of reading the bar code information. The buzzer drive circuit 4 drives a buzzer 20 to sound when the bar code information is read out by the binary signal processing circuit 2.

The CPU 6 controls the respective portions in the one-chip microcomputer 9 under control of control programs stored in the ROM 7.

A table containing a number of scans per second (referred to as a number of scans) and set values of the widths of LED lighting-on pulses is stored into an EEPROM (electrically erasable and programmable read only memory). A communication circuit 22 receives various commands from an external device and transmits them to the CPU 6, and transmits the result of reading the bar code information by the binary signal processing circuit 2 to the external device.

In the present embodiment, the light-projection LED array 11 forms a light projecting means; the CCD image sensor 15, an image pickup element as an image picking-up means; and the binarizing circuit 17, a binarizing means. The binary signal processing circuit 2 forms an analyzing means; the EEPROM 21 and the communication circuit 22 form operating frequency setting means and light-projection time setting means; the light-projection LED drive circuit 1, the CCD-drive control circuit 5 and the CPU 6 form control means.

Figure 2:
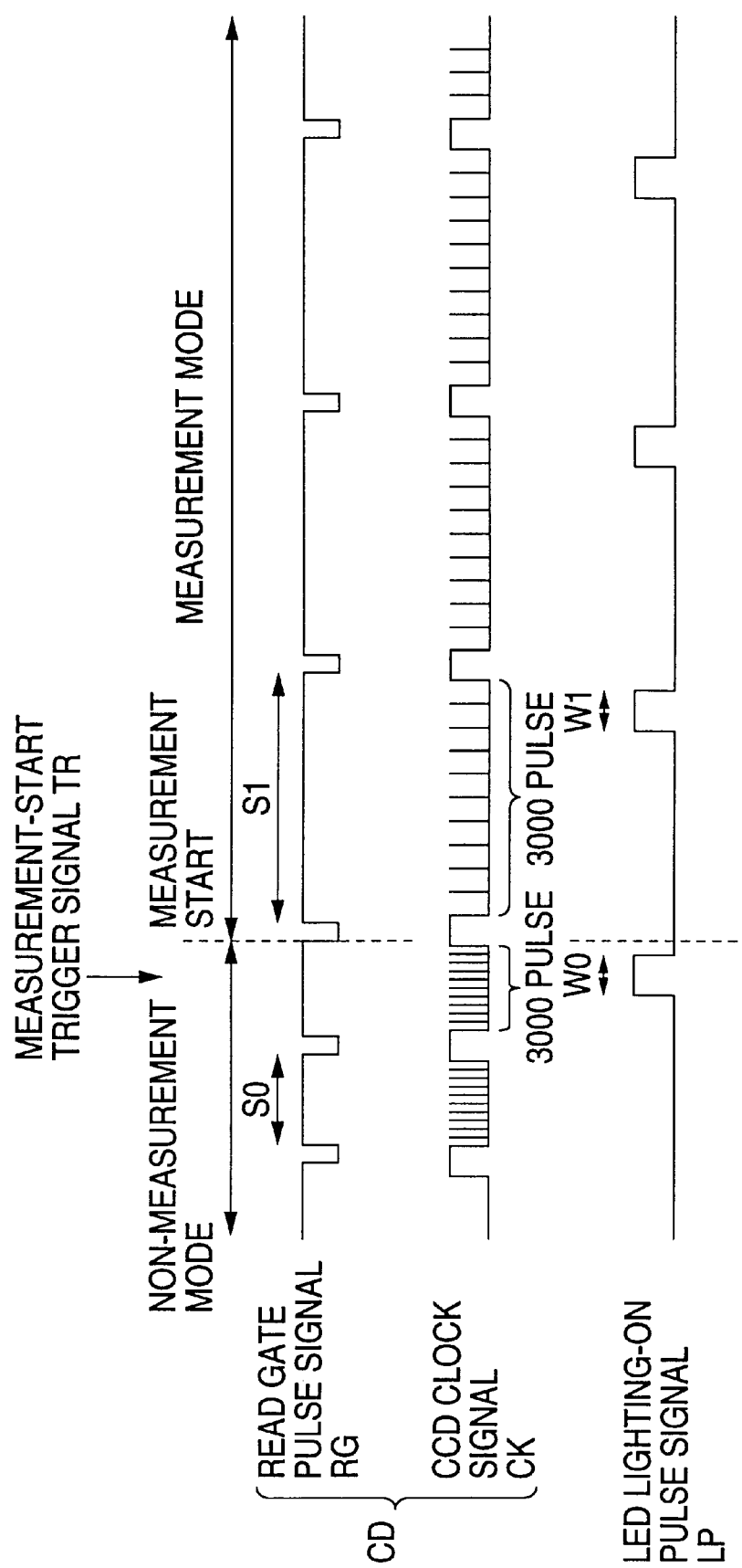
FIG. 2 is a diagram showing the waveforms of signals at the respective portions in the bar code reading device shown in FIG. 1.

FIG. 2 is a diagram showing the waveforms of signals at the respective portions in the bar code reading device shown in FIG. 1. In FIG. 2, a read gate pulse signal RG and a CCD clock signal CK are applied as a CCD-drive control signal CD to the CCD image sensor 15, from the CCD-drive control circuit 5. An LED lighting-on pulse signal LP is applied through the driver 10 to the light-projection LED array 11, from the light-projection LED drive circuit 1.

The pulse width of the read gate pulse signal RG is equal to a time period of one scan, and the pulse width of the LED lighting-on pulse signal LP is equal to a light projection time. In a non-measurement mode, the number of scans is set at the maximum value, and a scan time S0 is set at the minimum time. As a result, the CCD image sensor 15 is driven at the maximum operating frequency. Also in the non-measurement mode, the pulse width W0 of the LED lighting-on pulse signal LP is fixed at a predetermined value.

Upon application of a measurement-start trigger signal TR, a measurement starts when the next read gate pulse signal RG is generated. In a measurement mode, the scan time S1 of the read gate pulse signal RG and the CCD clock signal CK, and the pulse width W1 (LED lighting-on pulse width) of the LED lighting-on pulse signal LP are changed to set values, respectively.

Thus, the CCD image sensor 15 is driven at the maximum operating frequency before the measurement starts. Accordingly, the time from the inputting of the measurement-start trigger signal TR to the measurement start is minimized, thus ensuring a quick start of the measurement.

Figure 3:
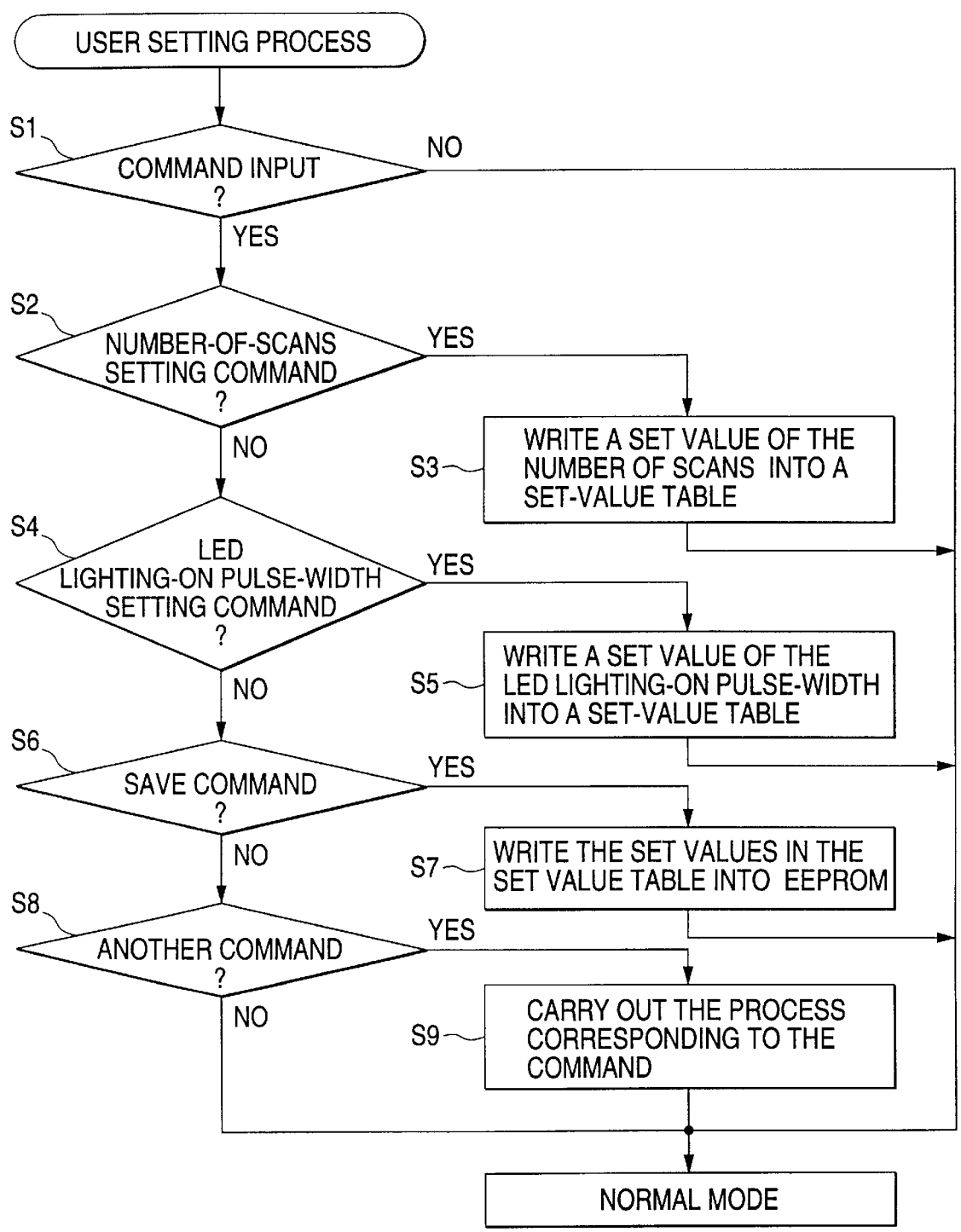
FIG. 3 is a flowchart showing a user setting process in the bar code reading device of FIG. 1.

Next, a user setting process in the bar code reading device of the present embodiment will be described with reference to a flowchart shown in FIG. 3.

To start, a command is inputted to the bar code reading device through the communication circuit 22 (step S1). The CPU 6 judges whether or not the command is a number-of-scans setting command (step S2). If it is the number-of-scans setting command, the CPU writes a set value of the number of scans which is inputted together with the number-of-scans setting command through the communication circuit 22, into a set-value table stored in the RAM 8 (step S3).

If the received command is not the number-of-scans setting command, the CPU judges whether or not the command is an LED lighting-on pulse-width setting command (step S4). If it is the LED lighting-on pulse-width setting command, the CPU writes a set value of the LED lighting-on pulse-width which is inputted together with the LED lighting-on pulse-width setting command through the communication circuit 22, into a set-value table stored in the RAM 8 (step S5).

If the inputted command is not the LED lighting-on pulse-width setting command, the CPU judges whether or not the command is a save command (step S6). If it is the save command, the CPU writes the set values in the set value table that is stored in the RAM 8 into the EEPROM 21 (step S7).

If the inputted command is another command (step S8), the CPU carries out the process corresponding to the command (step S9).

In this way, the set value of the number of scans and the set value of the LED lighting-on pulse width are stored in the form of a set value table in the EEPROM 21.

Figure 4:
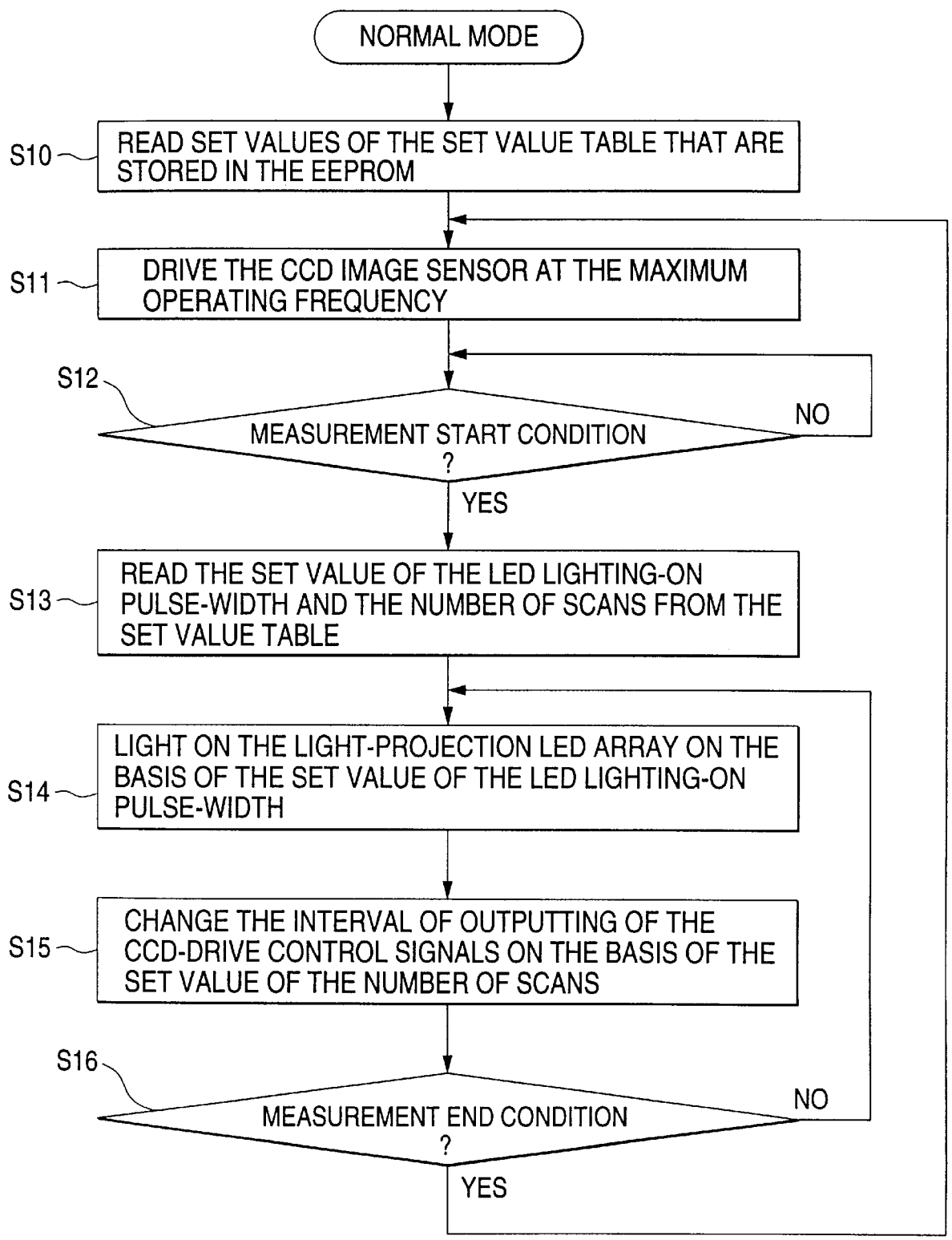
FIG. 4 is a flowchart showing the operation of the bar code reading device of FIG. 1 when the device is in a normal mode.

The operation of the bar code reading device of the present invention when the device is in a normal mode will be described with reference to a flowchart shown in FIG. 4.

The CPU 6 reads the values of the set value table that are stored in the EEPROM 21 into the RAM 8 (step S10). The CCD-drive control circuit 5 drives the CCD image sensor 15 at the maximum operating frequency (step S11). Then, it waits till a predetermined measurement start condition is satisfied (step S12). Here, the predetermined measurement start condition is to receive a measurement-start trigger signal TR from exterior or to receive a measurement start command through the communication circuit 22.

If the measurement start condition is satisfied, the CPU 6 reads the set value of the LED lighting-on pulse-width and the number of scans from the set value table (step S13). Then, the light-projection LED drive circuit 1 drives the light-projection LED array 11 through the driver 10 to light on the LED on the basis of the set value of the LED lighting-on pulse-width (step S14). The CCD-drive control circuit 5 changes the interval of the outputting of the CCD-drive control signals CD on the basis of the set value of the number of scans (step S15).

In this way, the CPU repeats the reading operation of the steps S14 and S15 till a predetermined measurement end condition is satisfied (step S16). Here, the predetermined measurement end condition is to read the same bar code information two times or to receive a measurement end command through the communication circuit 22.

Thus, in the bar code reading device of the present embodiment, the number of scans and the LED lighting-on pulse-width may be set in an arbitrary manner. Accordingly, the user can set those values so as to read the bar code information at the best processing speed and the best read rate in accordance with current use conditions.

Further, the CCD image sensor 15 has been driven at the maximum operating frequency before the measurement starts. Accordingly, the bar code reading device can quickly start the operation of reading bar code information at the number of scans and the LED lighting-on pulse-width that were set.

In the bar code reading device of the present embodiment, the light-projection LED drive circuit 1, the binary signal processing circuit 2, the LED lighting-on circuit 3, the buzzer drive circuit 4, and the CCD-drive control circuit 5 are contained in the one-chip microcomputer 9. Therefore, the size reduction of the bar code reading device is realized.

In the bar code reading device of the first invention, an operating frequency of the image pickup element may be arbitrarily preset by the operating frequency setting means. Therefore, the bar code reading device reads out bar code information in the best operating state in accordance with current use conditions.

In the bar code reading device of the second invention, a first operating frequency of the image pickup element may arbitrarily be set by the operating frequency setting means. Before a measurement starts, the image pickup element is driven at a second operating frequency that is higher than the first operating frequency. After the measurement starts, the operating frequency of the image pickup element is changed to the first operating frequency that is set. Accordingly, the user enables the bar code reading device to read out bar code information in the best operating state in accordance with current use conditions. A time from the issuance of a command to start a measurement to the start of the measurement is reduced, ensuring a quick start of the bar code measurement.

In the bar code reading device of the third invention, a time of projecting light by the light projecting means may be arbitrarily set in advance by the light-projection time setting means. Accordingly, the bar code reading device reads out bar code information in the best operating state in accordance with current use conditions.

What is claimed is:

1. A bar code reading device comprising:
   a light projecting means for projecting light on a bar code to be read out;
   an image picking-up means for receiving light reflected from the bar code that is illuminated with the light projected from said light projecting means and converting the reflected light into electrical signals;
   a binarizing means for converting the electrical signals outputted from said image picking-up means into binary data;
   an analyzing means for analyzing the binary data derived from said binarizing means and reading bar code information;
   an operating frequency setting means for manually setting an operating frequency of said image picking-up means in advance based on a user's judgement; and
   control means for driving said image picking-up means at the operating frequency set by said operating frequency setting means.

2. The bar code reading device according to claim 1, further comprising:
   a first LED which visually indicates the presence or absence of reading of the bar code information by said analyzing means; and
   a second LED which visually indicates a stability of reading of the bar code information by said analyzing means.

3. The bar code reading device according to claim 1, further comprising a buzzer which sounds when the bar code information is read out by said analyzing means.

4. A bar code reading device comprising:
a light projecting means for projecting light on a bar code to be read out;
an image picking-up means for receiving light reflected from the bar code that is illuminated with the light projected from said light projecting means and converting the reflected light into electrical signals;
a binarizing means for converting the electrical signals outputted from said image picking-up means into binary data;
an analyzing means for analyzing the binary data derived from said binarizing means and reading bar code information;
an operating frequency setting means for manually setting a first operating frequency of said image picking-up means in advance based on a user's judgement; and
control means for driving, before a measurement starts, said image picking-up means at a second operating frequency that is higher than the first operating frequency, and for changing, after the measurement starts, the operating frequency of said image picking-up means to the first operating frequency set by said operating frequency setting means.

5. The bar code reading device according to claim 4, further comprising:
a first LED which visually indicates the presence or absence of reading of the bar code information by said analyzing means; and
a second LED which visually indicates a stability of reading of the bar code information by said analyzing means.

6. The bar code reading device according to claim 4, further comprising a buzzer which sounds when the bar code information is read out by said analyzing means.

7. The bar code reading device according to claim 4, wherein the second operating frequency is at the maximum value of the operating frequency of said image picking-up means.

8. The bar code reading device according to claim 4, further comprising a light-projection time setting means for arbitrarily setting a time of projecting the light by said light projecting means in advance and wherein said control means operates such that said control means repeats a reading operation by said image picking-up means, said binarizing means and said analyzing means, and causes said light projecting means to project the light for the light projection time set by said light-projection time setting means every reading operation.

9. A bar code reading method comprising the steps of:
manually setting an operating frequency of an image picking-up means in advance based on a user's judgement;
projecting light on a bar code to be read out;
receiving light reflected from the bar code that is illuminated with the light to convert the reflected light into electrical signals by means of the image picking-up means;
converting the electrical signals outputted from the image picking-up means into binary data; and
analyzing the binary data derived from the binary means to read bar code information.

10. A bar code reading method according to claim 9, further comprising the step of repeating the projecting and receiving steps till a predetermined measurement condition is satisfied.

11. A bar code reading method comprising the steps of:
manually setting a first operating frequency and a second operating frequency of an image picking-up means in advance based on a user's judgement, the second operating frequency being higher than the first operating frequency;
projecting light on a bar code to be read out;
driving the image picking-up means at the second operating frequency;
changing the operating frequency of the image picking-up means from the second operating frequency to the first operating frequency;
receiving light reflected from the bar code that is illuminated with the light to convert the reflected light into electrical signals by means of the image picking-up means after the changing step;
converting the electrical signals outputted from the image picking-up means into binary data; and
analyzing the binary data derived from the binary means to read bar code information.

12. A bar code reading method according to claim 11, further comprising the step of repeating the projecting and receiving steps till a predetermined measurement condition is satisfied.

13. The bar code reading method according to claim 11, further comprising the step of driving the image picking-up means at the maximum operating frequency as the second operating frequency.

14. The bar code reading method according to claim 11, further comprising the step of receiving a command for changing the operating frequency of the image picking-up means.

15. The bar code reading method according to claim 11, further comprising the step of setting a time of projecting the light on the bar code to be read out.

16. A bar code reading method comprising the steps of:
setting, in advance, a time of projecting the light by a light projecting means based on a user's judgement;
projecting light on a bar code to be read out by means of the light projecting means;
receiving light reflected from the bar code that is illuminated with the light to convert the reflected light into electrical signals;
converting the electrical signals outputted from the image picking-up means into binary data; and
analyzing the binary data derived from the binarizing means to read bar code information.

17. A bar code reading method according to claim 16, further comprising the step of repeating the projecting and receiving steps till a predetermined measurement condition is satisfied.

18. The bar code reading method according to claim 16, further comprising the step of changing the time of projecting the light by the light projecting means before the projecting step.

19. A computer program product executable with a computer for reading a bar code, wherein a light projecting means projects light on the bar code light and light reflected from the bar code is converted into electrical signals by means of an image picking-up means, comprising program code means of:
means for manually setting an operating frequency of the image picking-up means in advance based on a user's judgement;
means for driving the light projecting means;

means for driving the image picking-up means at the set operating frequency; and means for terminating driving the light projecting means and the image picking-up means when a predetermined measurement end condition is satisfied.

20. The computer program product according to claim 19, further comprising means for repeating driving the light projecting means and the image picking-up means till the predetermined measurement condition is satisfied.

21. The computer program product according to claim 19, further comprising means for judging whether or not an inputted command is the operating frequency of the image picking-up means.

22. A computer program product executable with a computer for reading a bar code, wherein a light projecting means projects light on the bar code light and light reflected from the bar code is converted into electrical signals by means of an image picking-up means, comprising program code means of:

means for manually setting a first operating frequency and a second operating frequency of the image picking-up means in advance based on a user's judgement, the second operating frequency being higher than the first operating frequency;

means for driving the light projecting means;

means for driving the image picking-up means at the set first operating frequency and the set second operating frequency;

means for changing the operating frequency of the image picking-up means from the second operating frequency to the first operating frequency; and means for terminating driving the light projecting means and the image picking-up means when a predetermined measurement end condition is satisfied.

23. The computer program product according to claim 22, further comprising means for repeating driving the light projecting means and the image picking-up means till the predetermined measurement condition is satisfied.

24. The computer program product according to claim 22, wherein the second operating frequency is a maximum operating frequency of the image picking-up means.

25. The computer program product according to claim 22, further comprising means for receiving an inputted command for changing the operating frequency of the image picking-up means.

26. The computer program product according to claim 25, further comprising means for judging whether or not the inputted command is the operating frequency of the image picking-up means.

27. The computer program product according to claim 22, further comprising means for setting a time of driving the light projecting means.

28. The computer program product according to claim 27, further comprising means for receiving an inputted command for changing the operating frequency of the image picking-up means and setting a time of driving the light projecting means.

29. The computer program product according to claim 28, further comprising means for judging whether the inputted command is the operating frequency of the image picking-up means or the time of driving the light projecting means.

* * * * *